US009254738B2

(12) United States Patent
Schulte et al.

(10) Patent No.: US 9,254,738 B2
(45) Date of Patent: Feb. 9, 2016

(54) RECUPERATIVE TRANSMISSION DOWN SHIFTING MULTIPLE GEARS AND ENGINE DECOUPLING

(75) Inventors: Jurgen Schulte, San Diego, CA (US); Fillippo Muggeo, Endwell, NY (US); Derek Matthws, Vestal, NY (US); Brendan Pancheri, Milwaukee, WI (US)

(73) Assignee: BAE SYSTEMS CONTROLS, INC., Endicott, NY (US)

( * ) Notice: Subject to any disclaimer, the term of this patent is extended or adjusted under 35 U.S.C. 154(b) by 702 days.

(21) Appl. No.: 13/601,919

(22) Filed: Aug. 31, 2012

(65) Prior Publication Data

US 2014/0066250 A1    Mar. 6, 2014

(51) Int. Cl.
| | |
|---|---|
| *B60W 10/08* | (2006.01) |
| *B60K 6/387* | (2007.10) |
| *B60K 6/48* | (2007.10) |
| *B60K 6/547* | (2007.10) |
| *B60W 10/02* | (2006.01) |
| *B60W 10/115* | (2012.01) |
| *B60W 20/00* | (2006.01) |

(52) U.S. Cl.
CPC . *B60K 6/387* (2013.01); *B60K 6/48* (2013.01); *B60K 6/547* (2013.01); *B60W 10/02* (2013.01); *B60W 10/08* (2013.01); *B60W 10/115* (2013.01); *B60W 20/1062* (2013.01); *B60W 20/30* (2013.01); *B60W 2710/081* (2013.01); *B60W 2710/083* (2013.01); *B60W 2710/1005* (2013.01); *Y10T 477/24* (2015.01)

(58) Field of Classification Search
CPC .. B60W 20/1062; B60W 20/30; B60W 10/08
See application file for complete search history.

(56) References Cited

U.S. PATENT DOCUMENTS

| | | |
|---|---|---|
| 4,691,148 A | 9/1987 | Nicholls et al. |
| 7,976,427 B2 | 7/2011 | Yamamoto et al. |
| 2010/0133026 A1 | 6/2010 | Kim et al. |
| 2010/0304922 A1* | 12/2010 | Ohkubo et al. .................. 477/4 |
| 2012/0103709 A1 | 5/2012 | Mochiyama et al. |

FOREIGN PATENT DOCUMENTS

EP       1 970 240 A2     9/2008

OTHER PUBLICATIONS

International Search Report and Written Opinion dated Nov. 22, 2013 from related International Application No. PCT/US2013/057182.

* cited by examiner

*Primary Examiner* — Derek D Knight
(74) *Attorney, Agent, or Firm* — Scully, Scott, Murphy & Presser, PC

(57) ABSTRACT

A hybrid electric drive system for a hybrid powered vehicle which includes a combustion engine, and a transmission. An electric machine and the combustion engine are coupled to the transmission in the hybrid electric drive system providing engine and/or electric machine drive power for the vehicle. A clutch is mechanically communicating with and positioned between the combustion engine and the transmission to decouple the combustion engine from the transmission. An energy storage system is configured to transfer and receive power with the electric machine, and is configured to recharge using power from the electric machine. A hybrid system controller is configured to respond to a regenerative braking mode of the vehicle. While the hybrid electric drive system is in the regenerative braking mode, the hybrid system controller is configured to initiate shifting of the transmission into one or more selected gears relating to one or more selected electric machine speeds.

19 Claims, 2 Drawing Sheets

RECUPERATIVE TRANSMISSION DOWN SHIFTING MULTIPLE GEARS AND ENGINE DECOUPLING

FIELD OF THE INVENTION

The present invention relates to a hybrid electric drive system for a hybrid powered vehicle.

BACKGROUND OF THE INVENTION

Known hybrid power systems with hybrid drives or drive trains may include an internal combustion engine, and electric motor or machine combination. The engine may include a diesel or gasoline engine driving a power train and/or charging an energy storage system, for example, a high voltage battery, wherein the engine and the high voltage battery provide plural drive sources to a hybrid vehicle. It is also known to arrange an internal combustion engine and/or one or more electric machines in such a manner that they can be operatively connected to each other by gears, for example, planetary gear sets or the like, and couplings. Different operating states of the combustion engine and electric motor(s) can effect fuel consumption, dynamic performance of the vehicle, and pollutant emissions. These techniques focus on interactions between the engine, transmission and motor/generator during active driving.

In hybrid vehicles it is important to obtain higher more efficient use of fuel, and improve mileage per gallon of fuel consumed. This may be accomplished by a traction motor driving the vehicle as much as possible. In order to utilize the traction motor instead of burning fuel, it is necessary for a traction motor operating as a generator to recapture as much power as possible when the vehicle is being braked. Recapturing power is limited because a transmission gear ratio is linked to the speed range of a combustion engine, even though traction motor operation during regeneration may have a wider range of operation speeds.

SUMMARY OF THE INVENTION

Therefore, a need exists for a system and method to operate an electric motor at a higher speed to maximize regenerative energy in a hybrid powered vehicle to minimize use of fuel. Additionally, a need exists for a system and method for enhancing the performance of an electric motor of a hybrid electric drive system without being limited by a combustion engine speed range.

In an aspect of the present invention, a hybrid electric drive system for a hybrid powered vehicle includes a combustion engine, and a transmission. An electric machine and the combustion engine are coupled to the transmission in a hybrid electric drive system which provides engine and/or electric machine drive power for a hybrid powered vehicle. A clutch is mechanically communicating with and positioned between the combustion engine and the transmission to decouple the combustion engine from the transmission. An energy storage system is configured to transfer and receive power to and from the electric machine, and is configured to recharge using power from the electric machine. A hybrid system controller is configured to respond to a regenerative braking mode of the vehicle. While the hybrid electric drive system is in the regenerative braking mode, the hybrid system controller is configured to initiate shifting of the transmission into one or more selected gears relating to one or more selected electric machine speeds.

In another aspect of the present invention, a method for providing a hybrid electric drive system for a hybrid powered vehicle includes: providing a combustion engine; providing a transmission; coupling an electric machine and the combustion engine to the transmission in a hybrid electric drive system providing engine and/or electric machine drive power for a hybrid powered vehicle; mechanically communicating and positioning a clutch with and between the combustion engine and the transmission to decouple the combustion engine and the electric machine; configuring an energy storage system to transfer and receive power to and from the electric machine, and being configured to recharge using power from the electric machine; and configuring a hybrid system controller to respond to a regenerative braking mode of the vehicle, and while the hybrid electric drive system is in the regenerative braking mode, the hybrid system controller configured to initiate shifting of the transmission into one or more selected gears relating to one or more selected electric machine speeds.

In another aspect of the present invention, a method for providing power to an energy storage system of a hybrid powered vehicle during regenerative braking having a hybrid electric drive system includes a combustion engine, and a transmission. An electric machine and the combustion engine are coupled to the transmission for providing engine and/or electric machine drive power for the hybrid powered vehicle. The hybrid powered vehicle includes an energy storage system configured to transfer and receive power to and from the electric machine and is configured to recharge using power from the electric machine. The method comprising: decoupling the combustion engine and the transmission using a clutch mechanically communicating with and positioned between the combustion engine and the transmission; and shifting the transmission into one or more selected gears relating to one or more selected electric machine speeds during a regenerative braking mode using a hybrid system controller being configured to initiate the regenerative braking mode for the hybrid electric drive system.

BRIEF DESCRIPTION OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION OF THE INVENTION

Figure 1:
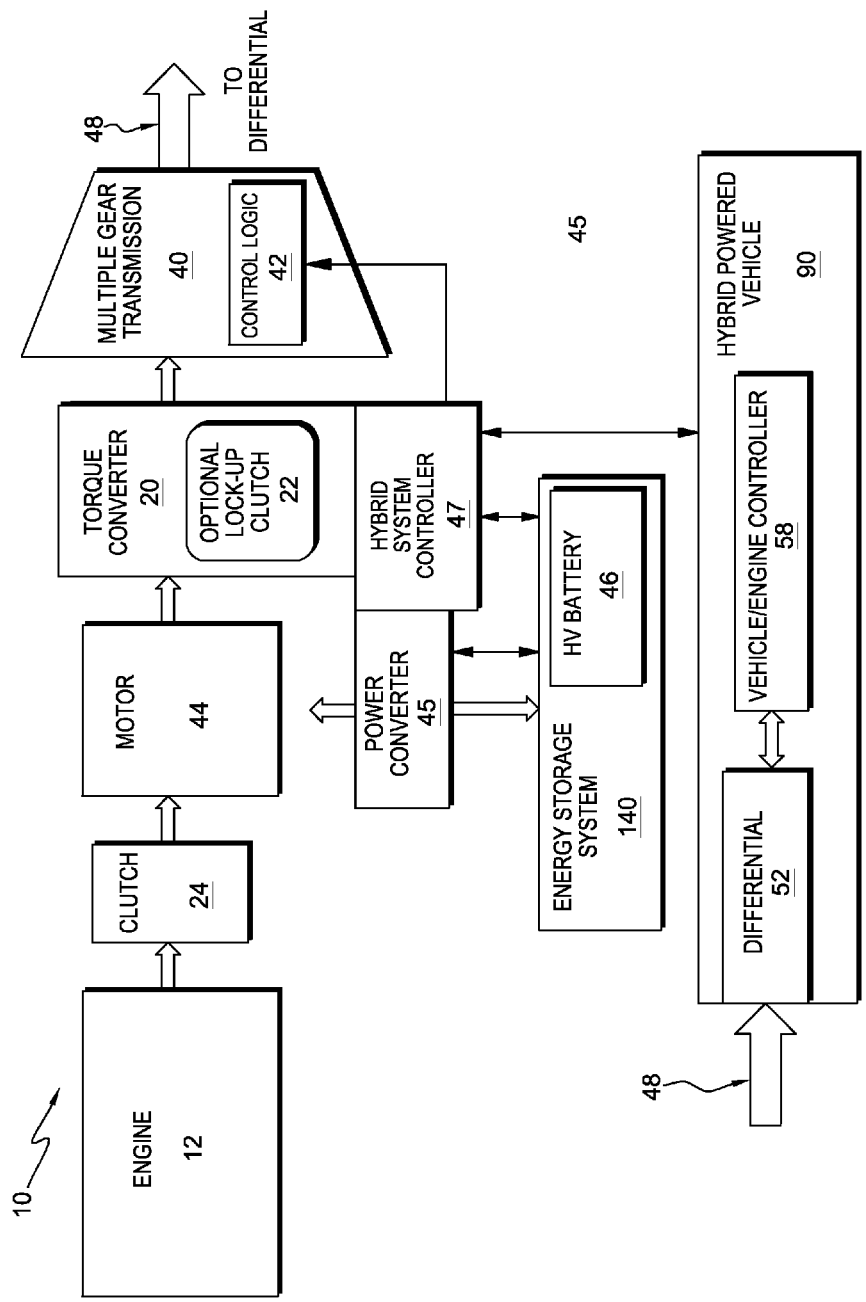
FIG. 1 is a schematic block diagram of a hybrid electric drive system.

Referring to FIG. 1, a hybrid electric drive system 10 (or alternatively described as a drive train), according to an embodiment of the invention, for a parallel hybrid powered vehicle 90 is described below. In the system 10, an electric machine is integrated between the engine and a transmission. For example, a transmission 40 is connected to a torque converter 20 which is positioned between the transmission 40 and an electric machine embodied as an electric motor 44. The torque converter 20 may optionally include a lock-up clutch 22. The optional lock-up clutch 22 may be closed during braking, that is, a negative torque request to the drive system. When the brake is released and the accelerator pedal engaged, that is, a positive torque request to the drive system, the optional lock-up clutch 22 may be opened. Depending on which gear the transmission has engaged and the speed of the vehicle, the lock up clutch may optionally be opened when accelerating. Alternatively, under certain conditions, it may not be possible to lock up the clutch during braking.

A combustion engine 12 and the electric motor 44 are both mechanically coupled to the transmission 40 to provide engine and/or motor drive power for the vehicle 90. A clutch 24 mechanically communicates with, and is positioned between, the combustion engine 12 and the electric motor 44. An energy storage system (ESS) 140 (or alternatively described as an electrical power supply) is configured to transfer and receive power to and from the electric motor 44. The electrical power supply 140 is electrically communicating with a rechargeable high voltage (HV) battery 46 (e.g., transferring voltage and current back and forth) which is configured to recharge using power from the electric motor 44, using a motor power converter/controller 45 communicating with both the energy storage system 140 and motor 44. The hybrid system controller 47 communicates with the vehicle/engine controller 58, the transmission control logic 42 and the power converter 45 to optimize regenerative braking and to control voltage and current, in and out of the battery 46 of the energy storage system 140. The transmission 40 is connected, represented by arrow 48, to a differential 52 of the vehicle 90.

A motor controller/hybrid system controller 47 (also referred to as a hybrid system controller) is configured to respond to a regenerative braking mode (also referred to as a recuperative braking process) of the hybrid electric drive system 10 initiated by an operator command, such as an operator depressing a brake pedal to begin braking of the vehicle. The motor controller/hybrid system controller 47 initiates management of part of the regenerative braking mode and interacts with control logic 42 of the transmission by communicating with the transmission to set gear selection and a lock up clutch mode. Also, the vehicle/engine controller 58 is configured to communicate with the hybrid system controller 47, as shown in FIG. 1.

In the regenerative braking mode, energy can be recuperated into the ESS. The motor controller/hybrid system controller 47 initiates shifting of the transmission 40 into a gear which allows for maximum electric motor 44 speed of an available plurality of speeds during the regenerative braking mode. Thus, a selected gear of the transmission 40, for example, a lower gear which would not be available as resulting in an RPM that is not typically used in conventional non-hybrid operation for the engine 12, may be used to maximize the electric machine speed, in this case, the electric motor 44 speed. Thereby, the electric motor 44 can run at a higher speed to optimize recuperative power (in the regenerative braking mode) from the motor to the ESS 140.

In alternative scenarios, motor controller/hybrid system controller 47 may initiate shifting of the transmission 40 into one or more gears which are the lower available gears, or lower than the presently used gear of the running vehicle. The controller may initiate selection of one or more of the electric motor 44 speeds to increase or maximize the motor speed. The speed of the electric motor 44 is higher than the speed of the electric motor when coupled to the engine, and thus, the clutch 24 allows the decoupling and increasing of the electric motor speed according to the disclosure herein.

In the embodiment of the invention discussed above, braking by an operator of the vehicle firstly initiates the regenerative braking mode, in response to which the motor controller/ hybrid system controller 47 carries out the electro/mechanical implementation to initiate the regenerative braking mode. Upon receiving a command from the operator, the regenerative braking mode can cease, and the engine can be used to power the vehicle. The clutch is closed when the engine's power is requested to reconnect the engine to the motor and thereby the transmission, which may be upon command of the operator when the operator depresses the accelerator of the vehicle.

Energy recaptured through regenerative braking will cease if battery is at full charge, or if the controller initiates re-coupling of the motor and the engine in response to the operator commands, for example, the operator pressing on the accelerator of the vehicle.

Figure 2:
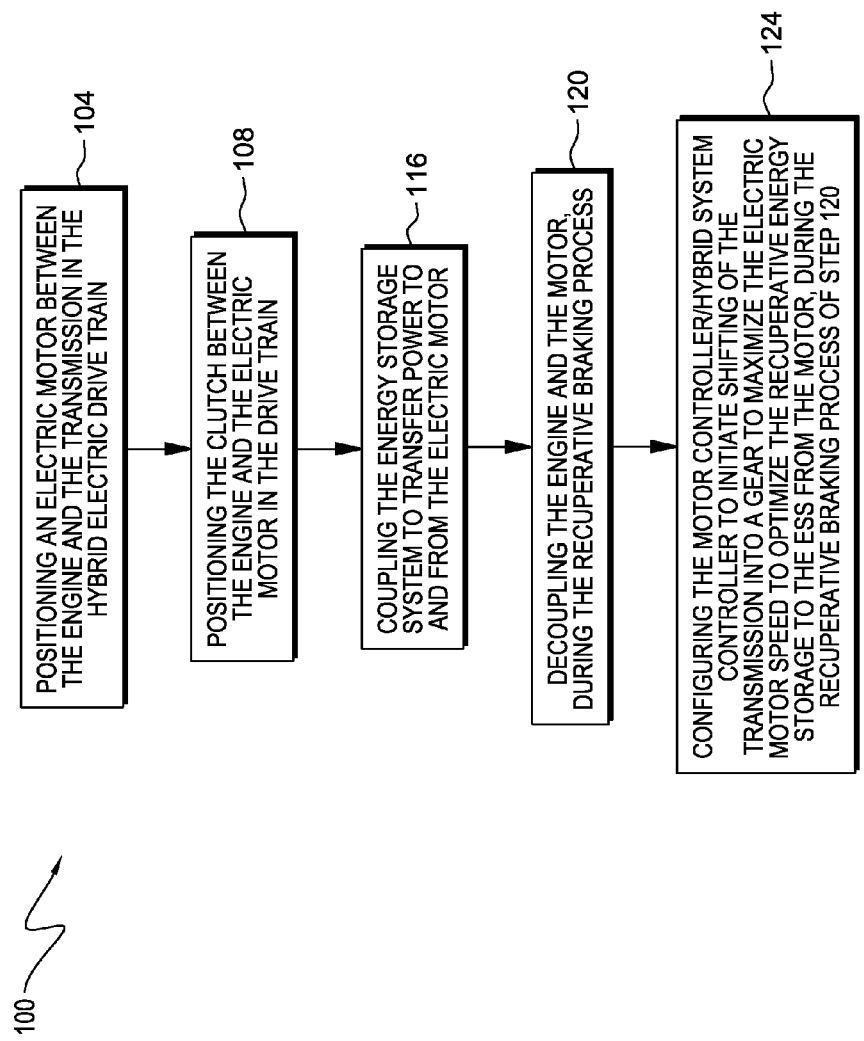
FIG. 2 is a method for providing the hybrid electric drive system of FIG. 1 to a hybrid powered vehicle.

Referring to FIG. 2, a method 100 according to an embodiment of the invention regarding the system 10 shown in FIG. 1, includes positioning the electric motor 44 between the engine 12 and the transmission 40 in the parallel hybrid vehicle drive train 10, in step 104. The clutch 24 is positioned between the engine 12 and the electric motor 44 in the drive train as shown in FIG. 1, in step 108. The electrical storage system 140 is coupled to the drive train to transfer and receive power to and from the electric motor 44, in step 116. In step 120, during the regenerative braking mode, the clutch 24 is initiated to operatively decouple the engine 12 and the motor 44. In step 124, the motor controller/hybrid system controller 47 is configured to initiate shifting of the transmission 40 into a gear to maximize the electric motor 44 speed to optimize the recuperative energy storage to the ESS 140 from the motor 44. Re-coupling the engine and the motor may be initiated by the motor controller/hybrid system controller 47 in response to operator commands, including, for example, the operator depressing an accelerator. For example, modes of operation for the hybrid vehicle may include, re-coupling the engine and the motor upon depletion of the ESS, or when power demands are communicated, or a combination of power demands and ESS depletion.

Thereby, the invention as described in the embodiment above provides a system and method for maximizing utilization of an electric machine, i.e. electric motor/generator, during regenerative braking of the hybrid vehicle. In the present disclosure, a transmission shift strategy is directed to the electric motor's speed capability, and not limited by the engine speed. The system of the present disclosure decouples the internal combustion engine of a parallel hybrid vehicle from the transmission during regenerative braking, and optimizes the gear selection of the transmission to maximize the speed of the electric machine. The method for optimizing the gear selection includes requests made to the transmission for the lowest available gear. The actual gears selected may be left to control logic 42 of the transmission. The system and method of the present disclosure advantageously allows for replacement of transmission and electric machines with different models, as often occurs during the operational life of long-haul tractors, while still providing maximum utilization of the electric machine.

In the system 10 described above of a single machine parallel hybrid vehicle drive train, the machine, motor 44, is integrated between the engine 12 and the transmission 40 which advantageously enables designing the motor 44 smaller and lighter, which further saves cost. In the system 10, during driving conditions in which the vehicle is powered by the internal combustion engine the operational range of the motor (or generator) is limited by the internal combustion engine. During the energy recuperation phase (regenerative braking mode) of the hybrid vehicle, the engine is decoupled and the electric machine (embodied as motor 44) to allow the utilization of the full potential of the electric machine, within the limits of the remaining powertrain components and connections, thereby enabling greater power transfer to the ESS 140. The extended operating range of the electric machine is possible since most transmissions allow a higher operating speed than a desired engine maximum speed.

Thus, as the motor controller/hybrid system controller 47 enters the regenerative braking mode, it shifts into the gear that allows for maximum electric machine speed. Due to the wide operating range of the electric machine it is not necessary to shift into every gear to achieve continuous recuperation power. Thereby, in the embodiment of the invention described above, the transmission gearing is optimized to utilize the electric motors unlike the transmission shift strategy in the prior art which is typically limited by engine speed range. In the present invention, a transmission shift strategy is possible which selects gearing based on using more of the electric motor's capacity. Also, the present invention is entirely independent of the type or model of transmission and motor/generator used.

While the present invention has been particularly shown and described with respect to preferred embodiments thereof, it will be understood by those skilled in the art that changes in forms and details may be made without departing from the spirit and scope of the present application. It is therefore intended that the present invention not be limited to the exact forms and details described and illustrated herein, but falls within the scope of the appended claims.

What is claimed is:

1. A hybrid electric drive system for a hybrid powered vehicle, comprising:
   a combustion engine;
   an electric machine;
   a transmission coupled to the combustion engine and the electric machine to provide engine and/or electric machine drive power for the hybrid powered vehicle;
   a clutch mechanically communicating with and positioned between the combustion engine and the electric machine to decouple the combustion engine from the electric machine and the transmission;
   an energy storage system configured to transfer and receive power to and from the electric machine, and being configured to recharge using power from the electric machine; and
   a hybrid system controller being configured to respond to a regenerative braking mode of the vehicle, and while the hybrid electric drive system is in the regenerative braking mode, the hybrid system controller being configured to decouple the combustion engine from the electric machine and select a transmission gear according to a selected electric machine speed and to shift the transmission into the selected gear thereby causing the electric machine to run at the selected speed.

2. The system of claim 1, wherein the electric machine is positioned between and mechanically coupled to the combustion engine and the transmission.

3. The system of claim 1, wherein the energy storage system is electrically communicating with a rechargeable high voltage (HV) battery.

4. The system of claim 1, wherein the selected transmission gear is selected according to a selected electric machine speed which is a higher speed than a desirable operation range of speeds of the combustion engine.

5. The system of claim 1, wherein the selected transmission gear is selected according to a maximum electric machine speed of the electric machine.

6. The system of claim 1, wherein the selected transmission gear is lower than a transmission gear engaged while the vehicle is not in the regenerative braking mode.

7. The system of claim 1, wherein the selected transmission gear is a lowest available gear determined by control logic in the transmission.

8. The system of claim 1, wherein the electric machine recharges the energy storage system when the hybrid electric drive system is in the regenerative braking mode.

9. A method for providing a hybrid electric drive system for a hybrid powered vehicle, comprising:
   providing a combustion engine;
   providing an electric machine;
   providing a transmission;
   coupling the transmission to the electric machine and the combustion engine for providing engine and/or electric machine drive power for the hybrid powered vehicle;
   mechanically communicating and positioning a clutch with and between the combustion engine and the electric machine to decouple the combustion engine and the electric machine;
   configuring an energy storage system to transfer and receive power to and from the electric machine, and being configured to recharge using power from the electric machine; and
   configuring a hybrid system controller to respond to a regenerative braking mode of the vehicle, and while the hybrid electric drive system is in the regenerative braking mode, the hybrid system controller being configured to decouple the combustion engine from the electric machine and select a transmission gear according to a selected electric machine speed and to shift the transmission into the selected gear thereby causing the electric machine to run at the selected speed.

10. The method of claim 9, further comprising:
    selecting a transmission gear which allows for an electric machine speed which is a higher speed than a desirable operation range of speeds of the combustion engine.

11. The method of claim 9, further comprising:
    selecting a transmission gear which allows for an electric machine speed to be increased when the transmission is in the selected gear maximum speed of the electric machine.

12. The method of claim 9, wherein the selected transmission gear is lower than a transmission gear engaged while the vehicle is not in the regenerative braking mode.

13. The method of claim 9, further comprising:
    selecting a lowest available transmission gear determined by control logic in the transmission.

14. The method of claim 9, further comprising:
    recharging the energy storage system using the electric machine when the hybrid electric drive system is in the regenerative braking mode.

15. A method for providing power to an energy storage system of a hybrid powered vehicle during regenerative braking having a hybrid electric drive system including a combustion engine, and a transmission, wherein an electric machine and the combustion engine are coupled to the transmission for providing engine and/or electric machine drive power for the hybrid powered vehicle, the hybrid powered vehicle including an energy storage system configured to transfer and receive power to and from the electric machine and being configured to recharge using power from the electric machine, the method comprising:

decoupling the combustion engine and the electric machine using a clutch mechanically communicating with and positioned between the combustion engine and the electric machine; and decoupling the combustion engine from the electric machine and selecting a transmission gear according to a selected electric machine speed and shifting the transmission into the selected gear thereby causing the electric machine to run at the selected speed during a regenerative braking mode using a hybrid system controller being configured to initiate the regenerative braking mode for the hybrid electric drive system.

16. The method of claim 15, further comprising:
selecting a transmission gear which is selected according to a selected electric machine speed which is a higher speed than a desirable operation range of speeds of the combustion engine.

17. The method of claim 15, further comprising:
selecting a transmission gear selected according to a maximum electric machine speed of the electric machine.

18. The method of claim 15, wherein the selected transmission gear is lower than a transmission gear engaged while the vehicle is not in the regenerative braking mode.

19. The method of claim 15, further comprising:
selecting a lowest available transmission gear determined by control logic in the transmission.

* * * * *